(12) United States Patent
Lee

(10) Patent No.: US 6,341,729 B1
(45) Date of Patent: Jan. 29, 2002

(54) MEMORY CARD

(75) Inventor: Chien-Yi Lee, Shulin (TW)

(73) Assignee: Ablemic Industrial Co., Ltd., Tu-Cheng (TW)

( * ) Notice: Subject to any disclaimer, the term of this patent is extended or adjusted under 35 U.S.C. 154(b) by 0 days.

(21) Appl. No.: 09/708,661

(22) Filed: Nov. 9, 2000

(51) Int. Cl.⁷ .............................................. G06K 19/06
(52) U.S. Cl. ...................................... 235/492; 361/737
(58) Field of Search ............................... 235/492, 493; 361/737

(56) References Cited

U.S. PATENT DOCUMENTS

| | | | | |
|---|---|---|---|---|
| 5,476,387 A | * | 12/1995 | Ramey et al. | 235/492 X |
| 5,497,297 A | * | 3/1996 | Kilmer et al. | 235/492 X |
| 5,529,503 A | * | 6/1996 | Kerklaan | 235/492 X |
| 6,058,018 A | * | 5/2000 | Gerritis et al. | 361/737 |
| 6,108,209 A | * | 8/2000 | Cox et al. | 235/492 X |
| 6,128,194 A | * | 10/2000 | Francis | 235/492 X |

\* cited by examiner

Primary Examiner—Michael G. Lee
Assistant Examiner—Daniel Walsh
(74) Attorney, Agent, or Firm—Jones, Tullar & Cooper, P.C.

(57) ABSTRACT

A memory card includes a frame, an electrical circuit board inserted in the frame, a front cover securely attached on a front side of the frame and a rear cover securely attached on a rear side of the frame. The frame is defined with through slots to let male and female fasteners respectively formed around edges of the front and rear covers to extend therein. The male and female fasteners of the front cover are extended into the through slots from a front side of the frame and securely engaged with the corresponding female and male fasteners of the rear cover, which are extended into the through slots from a rear side of the frame. In such a way, the memory card is easily assembled without special equipment, and the production efficiency of the memory card is greatly reduced.

6 Claims, 5 Drawing Sheets

MEMORY CARD

BACKGROUND OF THE INVENTION

1. Field of the Invention

The present invention relates to a memory card, which is used in a digital camera or an MP3 device or a PDA device, or used as a PCMCIA card for a portable computer and which is easily assembled with high efficiency under a low fabrication cost.

2. Description of Related Art

As shown in FIG. 5, a conventional memory card used in a digital camera, an MP3 device or a PDA device, or used as a PCMCIA card for a portable computer generally has a rectangular frame (80), an electrical circuit board (81) inserted in the frame (80), a front cover (82) securely attached on a front side of the frame (80) and a rear cover (83) securely attached on a rear side of the frame (80). Front side and rear side surfaces of the frame (80) are respectively defined with grooves (801) corresponding to rim edges (820, 830) of the front cover (82) and the rear cover (83). The rim edges (820, 830) of the front cover (82) and the rear cover (83) are respectively fitted in the corresponding grooves (801) defined in the frame (80) and secured in the grooves (801) by ultrasonic bonding or thermoplastic adhesion or laser welding etc.

The above described conventional memory card has a good solid seal between the front and rear covers (82, 83) and the frame (80). However the conventional memory cards have the following disadvantages:

1. to assemble a finished memory card, the thermoplastic adhesion process takes about 12 seconds, the ultrasonic bonding process takes about 3 to 4 seconds, and the laser welding process takes about 22 seconds, so the production efficiency of assembly of the memory cards is low;
2. as additional special equipment is required by either the ultrasonic bonding process or the laser welding process in the fabrication of the memory cards, the investment in the production must be high, so the production cost of the memory cards is also high.

Therefore, it is an objective of the present invention to provide an improved memory card to mitigate and/or obviate the aforementioned problems.

SUMMARY OF THE INVENTION

The objection of the present invention is to provide a memory card, which consists of a frame, an electrical circuit board inserted in the frame, a front cover securely attached on a front side of the frame and a rear cover securely attached on a rear side of the frame. The frame is defined with through slots to let male and female fasteners respectively formed around edges of the front and the rear covers to extend therein. Whereby the male and female fasteners of the front cover are extended into the through slots from a front side of the frame and securely engaged with the corresponding female and male fasteners formed around the rear cover and extended into the through slots from a rear side of the frame. In such a way any special equipment for fabrication of the memory card is not required, and as the memory card is easily assembled in only 2 to 3 seconds for one piece, the fabrication efficiency of the memory card is high and cost-effective.

The detailed features of the present invention will be apparent in the detailed description with appropriate reference to the accompanying drawings.

DETAILED DESCRIPTION OF THE PREFERRED EMBODIMENT

Figure 1:
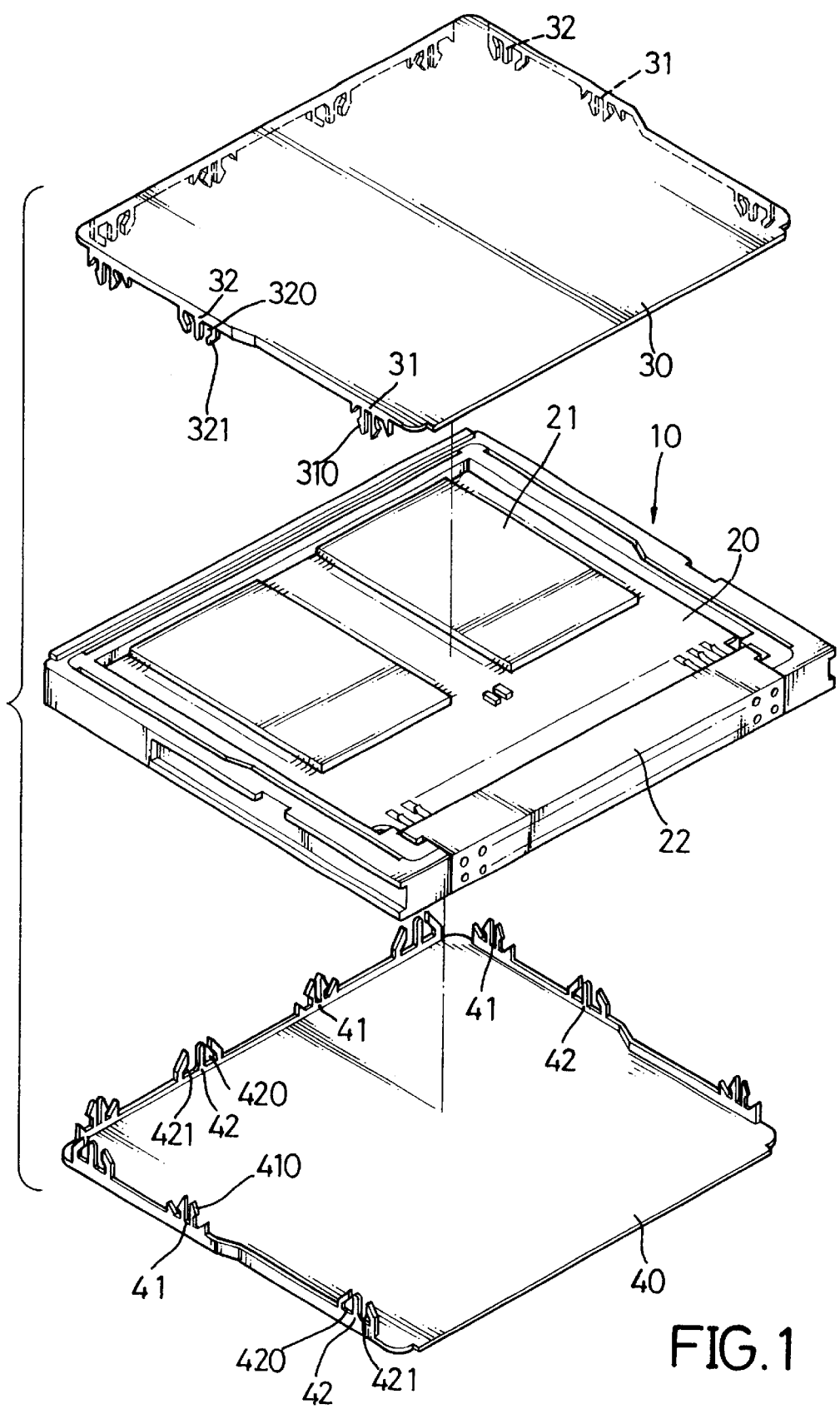
FIG. 1 is an exploded perspective view of a memory card in accordance with the present invention.

As shown in FIG. 1, a memory card in accordance with the present invention comprises a frame (10), an electrical circuit board (20) inserted in the frame (10), a front cover (30) securely attached on a front side of the frame (10) and a rear cover (40) securely attached on a rear side of the frame (10). The electrical board (20) includes compact flash memory chips (21) and an I/O connector (22). The front over (30) has a plurality of male fasteners (31) and female fasteners (32) formed therearound corresponding to a plurality of female fasteners (42) and male fasteners (41) formed around the rear cover (40).

Figure 2:
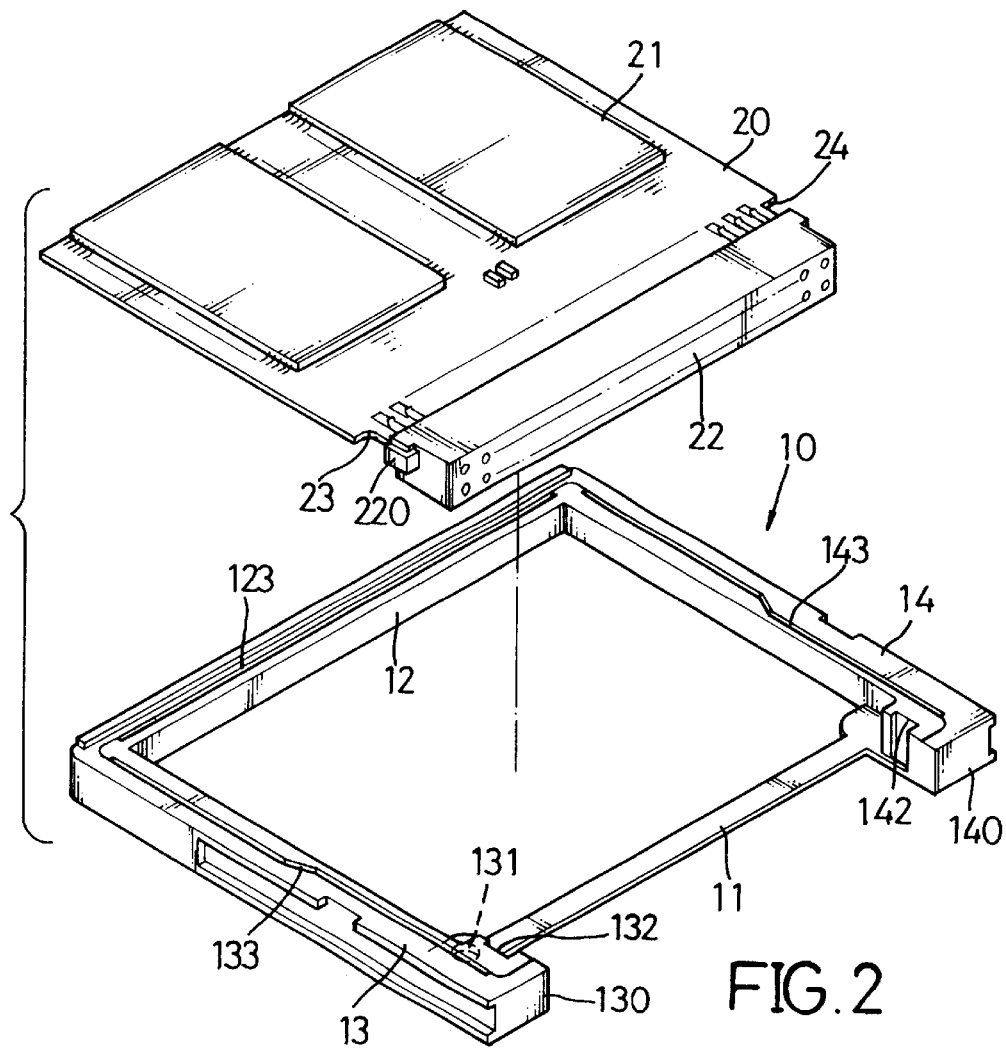
FIG. 2 is a partial exploded perspective view of the memory card in accordance with the present invention.

Now with reference to FIG. 2, the frame (10) is integrally formed as a rectangular member having a front border (11), a rear border (12) and two side borders (13, 14). Each one of the side borders (13, 14) has an extension (130, 140) protruded from an end near the front border (11). An identification hole (131) is defined in one of the extensions (130, 140). The extensions (130, 140) are respectively defined with two sockets (132, 142) in two inner side surfaces thereof corresponding to two spigots (220) integrally formed at opposite sides of the I/O connector (22). The rear border (12) and the side borders (13, 14) are respectively defined with through slots (123, 133, 143) each with a width which is slightly larger than the thickness of the male and female fasteners (31, 41, 32, 42).

An orientation device is provided on the frame (10) and the electrical circuit board (20) to ensure the electrical circuit board (20) is inserted into the frame (10) in a correct direction. The orientation device includes two notches (23, 24) respectively defined at two opposite sides of the electrical circuit board (20). The notches (23, 24) are respectively shaped differently corresponding to two different shaped outer corners formed at two opposite inner sides of the extensions (130, 140). As shown in FIG. 2, in one embodiment the notch (23) has an arcuate corner corresponding to an arcuate outer corner formed at one side of the extension (130), and the notch (24) is a right angle corner corresponding to a right angle outer corner formed at another side of the extension (140).

Figure 3:
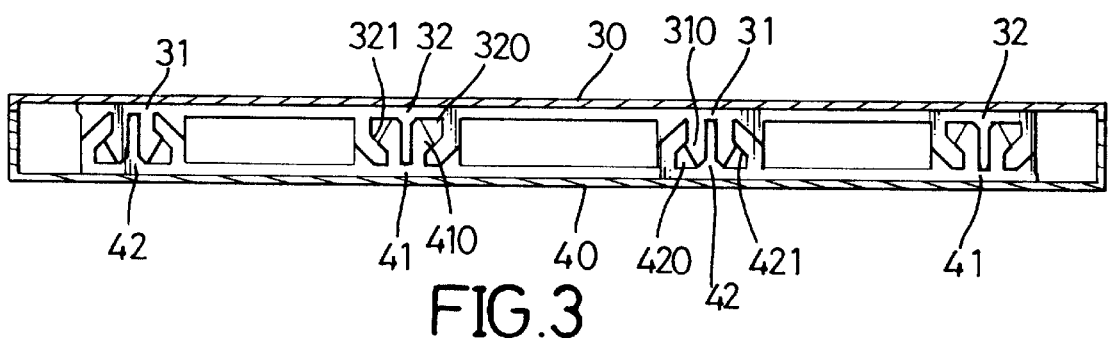
FIG. 3 is a schematic cross-sectional view of the memory card in accordance with the present invention, showing a front cover of the memory card engaged with a rear cover of the memory card.

The male and female fasteners (31, 32) are respectively extended into the through slots (123, 133, 143) from a front side of the frame (10) and respectively engage with the female and male fasteners (42, 41), which are respectively extended into the through slots (123, 133, 143) from a rear side of the frame (10). As illustrated in FIG. 3, each one of the male fasteners (31, 41) has two parallel trip dogs (310, 410) with two wedge-shaped upper ends formed thereon. Each one of the female fasteners (32, 42) respectively has two slots (320, 420) defined therein corresponding to the two trip dogs (310, 410). Each one of the slots (320, 420) has an inclined edge (321, 421) formed corresponding to the trip dogs (410, 310) to retain the trip dogs (410, 310) therein. The trip dogs (310) of the male fasteners (31) of the front cover (30) are wedged into the slots (420) of the female fasteners (42), as the trip dogs (310) are respectively pressed against the inclined edges (421) of the slots (420), and the trip dogs (310) of the front cover (30) are displaced closely to the rear cover (40). By the same principle, the trip dogs (410) of the male fasteners of the rear cover (40) are wedged into the slots (320), as the trip dogs are respectively pressed against the inclined edges (321) of the slots (320), and the trip dogs (410) of the rear cover (40) are displaced closely to the front cover (30).

Because the width of the through slots (123, 133, 143) are nearly equal to and slightly larger than the thickness of the male and female fasteners (31, 41, 32, 42), the male and female fasteners (31, 32) of the front cover (30) are ensured to be inserted into the through slots (123, 133, 143) and securely engaged with the female and male fasteners (42, 41) of the rear cover (40) correspondingly.

Figure 4B:
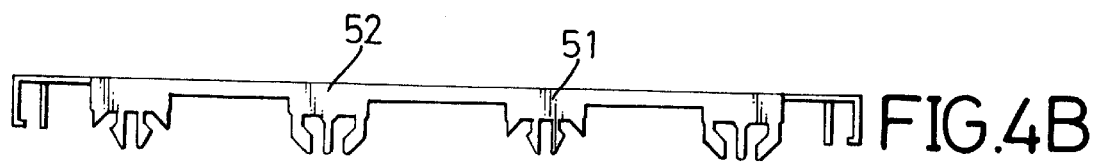
FIGS. 4A–4C are plan views of another embodiment of a ear cover of the memory card in accordance with the present invention.
Figure 4A:
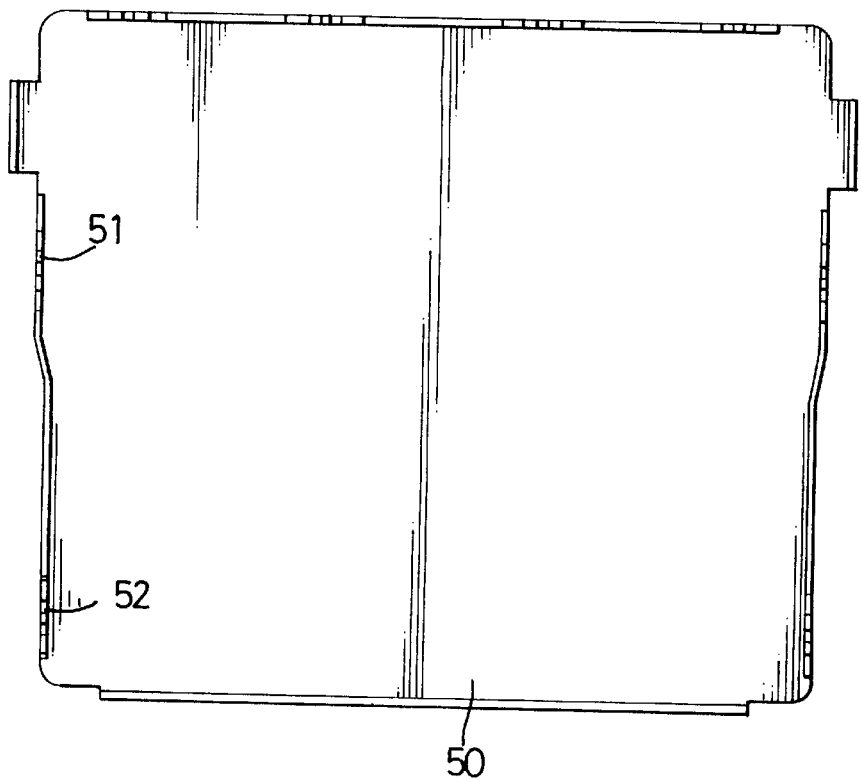
Figure 4D:
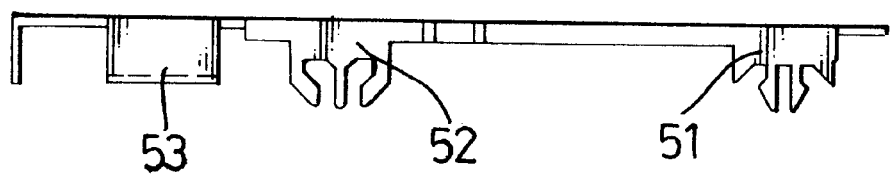
Figure 4C:
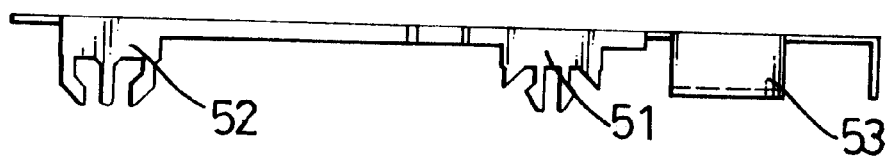
Figure 5:
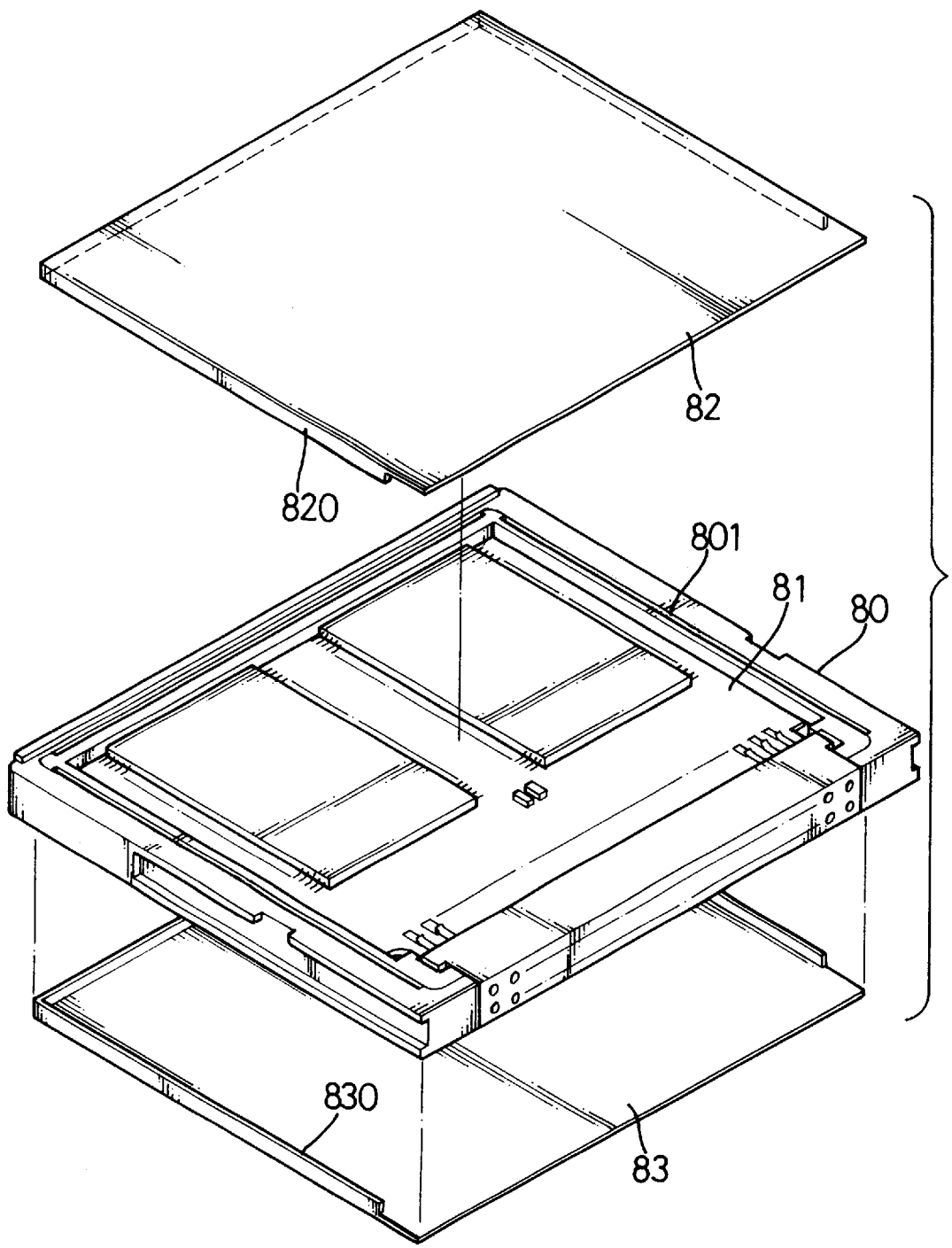
FIG. 5 is an exploded perspective view of a conventional memory card.

As shown in FIGS. 4A to 4C, a rear cover (50) of another practicable embodiment of the present invention with a left side view, a right side view and a rear side view of the rear cover (50), which is formed with a plurality of male and female fasteners (51, 52) around two opposite side edges and a rear side edge thereof, and particularly formed with two L-shaped fasteners (53) at the opposite side edges thereof A front cover having a structure corresponding to the rear cover (50) is omitted in drawings for clarity.

The memory card of the invention has the following advantages:

1. assembly of each memory card takes only 2 to 3 seconds, whereby production efficiency is high and cost-effective;
2. as the memory card of the present invention is assembled without the need to invest in any special equipment, the production cost is low.

It is to be understood, however, that even though numerous characteristics and advantages of the present invention have been set forth in the foregoing description, together with details of the structure and function of the present invention, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A memory card comprising:

a frame (10);

an electrical circuit board (20) inserted in the frame (10);

a front cover (30) securely attached on a front side of the frame (10); and a rear cover (40) securely attached on a rear side of the frame (10), wherein the frame (10) is defined with through slots (123, 133, 134) to receive male and female fasteners (31, 32) formed around the front cover (30) and male and female fasteners (41, 42) formed around the rear cover (40) respectively therein, each one of the male fasteners (31, 41) has two trip dogs (310, 410) with two wedge-shaped upper ends formed thereon, and each one of the female fasteners (32, 42) is defined with two slots (320, 420) corresponding to the trip dogs (310, 410), each one of the slots (320, 420) of the female fastener (32, 42) has an inclined edge (321, 421) formed at an inner side defining the slot to retain each trip dogs (310, 410) of the male fasteners (31, 41), whereby the male and female fasteners (31, 32) extending into the through slots (123, 133, 143) from a front side of the frame (10) are securely engaged with the female and male fasteners (42, 41) extended into the through slots (123, 133, 143) from a rear side of the frame (10) correspondingly.

2. The memory card as claimed, in claim 1, wherein a width of each of the through slots (123, 133, 143) is slightly larger than a thickness of each of the male and female fasteners (31, 41, 32, 42).

3. The memory card as claimed in claim 1, wherein an orientation device is provided on the frame (10) and the electrical circuit board (20) to ensure correct directional insertion of the electrical circuit board (20) inserted in the frame (10).

4. The memory card as claimed in claim 3, wherein the orientation device includes two notches (23, 24), each notch (23, 24) having a shape different to the other notch (23, 24) and being defined at two opposite sides of the electrical circuit board (20) corresponding to two different shaped outer corners formed at opposite sides of the frame (10).

5. The memory card as claimed in claim 4, wherein one of the notches (23, 24) is an arcuate corner corresponding to an arcuate outer corner formed at one side of the frame (10), and another one of the notches (23, 24) is a right angle corner corresponding to a right angle outer corner formed at another side of the frame (10).

6. The memory card as claimed in claim 1, wherein at least two L-shaped fasteners (53) are respectively formed on opposite sides of the front and the rear covers of the memory card.

* * * * *